Reissued June 1, 1943

Re. 22,329

UNITED STATES PATENT OFFICE 22,329

PYRAZOLONE COUPLERS FOR COLOR PHOTOGRAPHY

Henry D. Porter and Arnold Weissberger, Rochester, N. Y., assignors to Eastman Kodak Company, Rochester, N. Y., a corporation of New Jersey No Drawing. Original No. 2,311,082, dated February 16, 1943, Serial No. 419,173, November 14, 1941. Application for reissue March 31, 1943, Serial No. 481,354

10 Claims. (Cl. 95—6)

This invention relates to photographic color forming compounds and particularly to pyrazolone color forming coupler compounds.

The formation of colored photographic images by coupling the development product of aromatic amino developing agents with color forming or coupling compounds is well known. In these processes the subtractive process of color formation is ordinarily used and the image dyes are intended to be of the complementary primary colors cyan or blue-green, magenta, and yellow. The couplers which produce the cyan dyes are usually phenols or naphthols, those producing the magenta dyes are ordinarily pyrazolones or cyano acetyl compounds, and those producing the yellow dyes are ordinarily compounds containing a methylene group having two carbonyl groups attached to it. The dyes produced by coupling are azomethines, indamines or indophenols depending upon the composition of the coupler and of the developer.

We have now found a novel type of pyrazolone coupler which produces dyes having good absorption characteristics and good stability. These couplers have the following general formula:

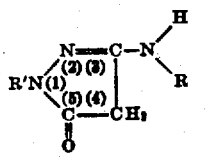

where

R =alkyl or aryl
R'=H, alkyl, or acyl

The folowing examples illustrate compounds of this general class:

(1)

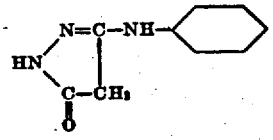

3-anilino-5-pyrazolone (2)

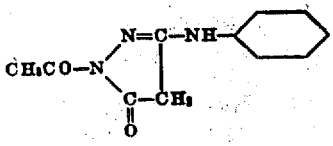

1-acetyl-3-anilino-5-pyrazolone (3)

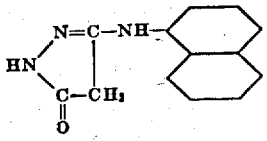

3-α-naphthylamino-5-pyrazolone (and 1-acetyl derivative)

(4)

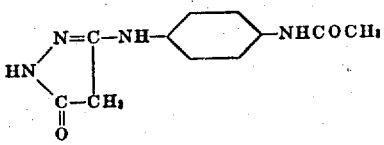

3-p-acetaminoanilino-5-pyrazolone (5)

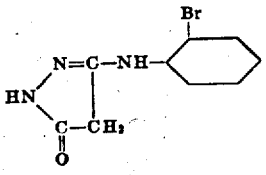

3-o-bromanilino-5-pyrazolone (and 1-acetyl derivative)

(6)

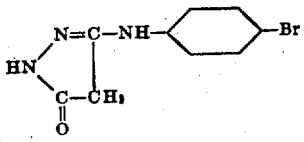

3-p-bromanilino-5-pyrazolone (and 1-acetyl derivative)

(7)

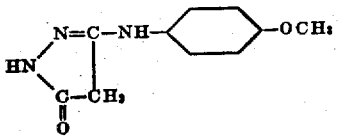

3-p-methoxyanilino-5-pyrazolone (8)

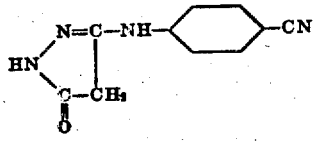

3-p-cyanoanilino-5-pyrazolone (and 1-acetyl derivative)

(9)

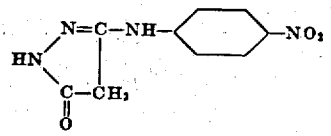

3-p-nitroaniline-5-pyrazolone (10)

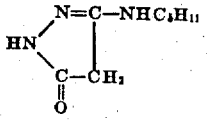

3-n-amylamino-5-pyrazolone (11)

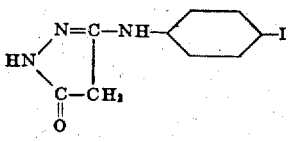

3-p-iodoanilino-5-pyrazolone (and 1-acetyl derivative)

(12)

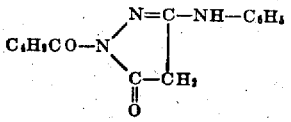

1-n-valeryl-3-anilino-5-pyrazolone (13)

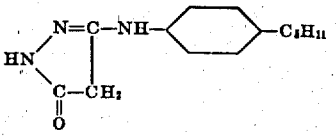

3-p-tert. amylanilino-5-pyrazolone (14)

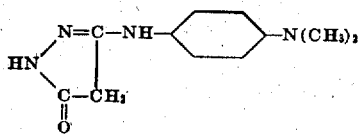

3-p-dimethylaminoanilino-5-pyrazolone (15)

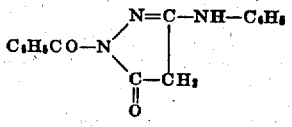

1-benzoyl-3-anilino-5-pyrazolone (16)

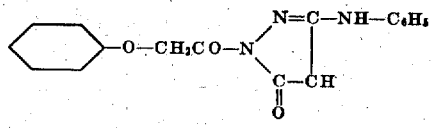

1-phenoxyacetyl-3-anilino-5-pyrazolone (17)

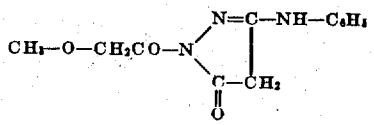

1-methoxyacetyl-3-anilino-5-pyrazolone (18)

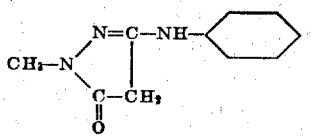

1-methyl-3-anilino-5-pyrazolone

The novel couplers of our invention are prepared by a modification of the procedure described in Journal of the American Chemical Society, vol. 44, 1924, page 1551 and vol. 46, 1926, page 2832. An isothiocyanate is condensed with ethylacetoacetate and the product is reacted with hydrazine hydrate or an alkylhydrazine according to the following general scheme:

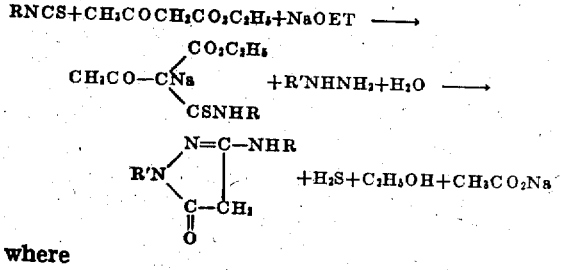

where

R =alkyl or aryl
R′=H or alkyl

By variation of the group attached to the amino nitrogen in the 3-position of the pyrazolone ring couplers may be prepared which have the required solubility and other properties for use in various methods of color photography. Furthermore, the couplers can be acylated by reaction with an organic acid anhydride or by an acid chloride in the presence of a condensing agent such as pyridine. This affords another means of varying the properties of the couplers.

Our couplers are designed for use in processes in which the coupler is incorporated in the developing solution such as those described in Mannes and Godowsky U. S. Patent 2,113,329, granted April 5, 1938, or Mannes, Godowsky & Wilder U. S. Patent 2,252,718, granted August 19, 1941. Certain of the couplers of our invention may be incorporated in sensitive emulsion layers for use in processes such as those described in Fischer U. S. Patent 1,055,155, granted March 4, 1913, Mannes & Godowsky U. S. Patents 2,304,939 and 2,304,940, granted December 15, 1942, and Jelley and Vittum U. S. application Serial No. 371,612, filed December 26, 1940.

The following examples illustrate developing solutions containing the couplers used according to our invention:

*Example 1*

| | | |
|---|---|---|
| A. 2-amino-5-diethylaminotoluene hydrochloride | grams | 2 |
| Sodium sulfite (anhydrous) | do | 2 |
| Sodium carbonate (anhydrous) | do | 20 |
| Potassium bromide | do | 1 |
| Water to | liter | 1 |
| B. 3-anilino-5-pyrazolone | grams | 2 |
| Sodium hydroxide (10% solution) | cc | 10 |
| B is added to A. | | |

*Example 2*

| | | |
|---|---|---|
| A. Dimethyl-p-phenylenediamine sulfate | grams | 3 |
| Sodium sulfite (anhydrous) | do | 5 |
| Sodium carbonate (anhydrous) | do | 20 |
| Potassium bromide | do | 2 |
| Water to | liter | 1 |
| B. 3-n-amylamino-5-pyrazolone | grams | 3 |
| Isopropyl alcohol | cc | 100 |
| B is added to A. | | |

The foregoing examples refer to the addition of the coupler compound to the developing solution itself. The coupler may also be added to the emulsion layer provided that suitable means are used to prevent its diffusion in the case of multilayer coatings. Special dispersing agents may be used for incorporating the coupler compound in the emulsion and in certain cases the coupler may be absorbed or adsorbed to the sensitive salt or may be combined with the sensitive salt as a chemical combination.

In the development of exposed photographic silver halide emulsion layers, using the couplers of our invention, any color forming developer containing a primary amino group may be used. These include developers having two primary amino groups as well as those having one of the amino groups substituted or having substituents in the ring such as alkyl phenylenediamines and alkyl toluylene diamines. These compounds are usually used in the salt form such as the hydrochloride or the sulfate which are more stable than the amines themselves. Suitable compounds are diethyl-p-phenylenediamine hydrochloride, monomethyl-p-phenylenediamine hydrochloride, dimethyl-p-phenylenediamine hydrochloride and 2 - amino - 5-diethylaminotoluene hydrochloride. The p-amino phenols and their substitution products may also be used where the amino group is unsubstituted. All of these developers have an unsubstituted amino group which enables the oxidation products of the developer to couple with the color forming compounds to form a dye image.

Our development process may be employed for the production of colored photographic images in layers of gelatin or other carriers, such as collodion, organic esters of cellulose, or synthetic resins. The carrier may be supported by a transparent medium such as glass, a cellulose ester or a non-transparent reflecting medium such as paper or an opaque cellulose ester. The emulsion may be coated as a single layer on the support or as superposed layers on one or both sides of the support. The superposed layers may be differentially sensitized and the dyes formed therein by coupling may be bleached by an oxidizing agent such as chromic acid to colorless soluble compounds. The destruction of the dye in this way does not destroy the silver image and a silver image may be developed, bleached and developed to color images in superposed layers as described, for example; in Mannes & Godowsky U. S. Patent No. 2,113,329.

The examples and compounds set forth in the present specification are illustrative only and it is to be understood that our invention is to be taken as limited only by the scope of the appended claims.

We claim:

1. A color forming photographic developer comprising a primary aromatic amino developing agent and a coupler compound having the formula:

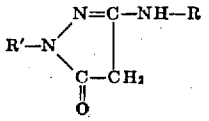

in which R is selected from the class consisting of alkyl groups and aryl groups, R′ is selected from the class consisting of hydrogen, alkyl and acyl groups 2. A color forming photographic developer comprising a primary aromatic amino developing agent and a coupler compound having the formula:

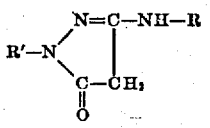

in which R is an aryl group and R′ is selected from the class consisting of hydrogen and acyl groups.

3. A color forming photographic developer comprising a primary aromatic amino developing agent and a coupler compound having the formula:

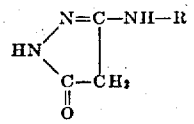

in which R is an aryl group.

4. A color forming photographic developer comprising a primary aromatic amino developing agent and a coupler compound having the following formula:

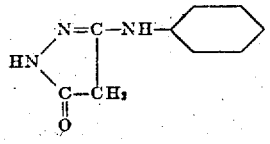

5. A color forming photographic developer comprising a primary aromatic amino developing agent and a coupler compound having the following formula:

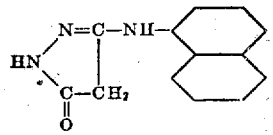

6. A color forming photographic developer comprising a primary aromatic amino developing agent and a coupler compound having the following formula:

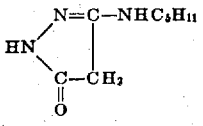

7. The method of producing a magenta colored photographic image in a gelatino-silver halide emulsion layer which comprises exposing the layer and developing it with a primary aromatic amino developing agent in the presence of a coupler compound having the formula:

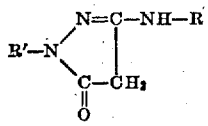

in which R is selected from the class consisting of alkyl groups and aryl groups, R′ is selected from the class consisting of hydrogen, alkyl and acyl groups.

8. The method of producing a magenta colored photographic image in a gelatino-silver halide emulsion layer which comprises exposing the layer and developing it with a primary aromatic amino developing agent in the presence of a coupler compound having the formula:

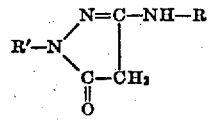

in which R is an aryl group and R′ is selected from the class consisting of hydrogen and acyl groups.

9. A photographic emulsion for forming colored images comprising a colloidal carrier containing a sensitive silver halide and a coupler compound having the formula:

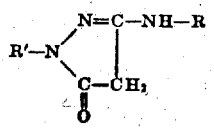

in which R is selected from the class consisting of alkyl groups and aryl groups, R' is selected from the class consisting of hydrogen, alkyl and acyl groups.

10. A photographic emulsion for forming colored images comprising a colloidal carrier containing a sensitive silver halide and a coupler compound having the formula:

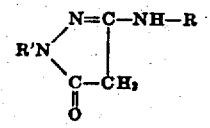

in which R is an aryl group and R' is selected from the class consisting of hydrogen and acyl groups.

HENRY D. PORTER.
ARNOLD WEISSBERGER.